(12) United States Patent
Choe

(10) Patent No.: US 9,893,560 B2
(45) Date of Patent: Feb. 13, 2018

(54) AC-DC POWER SUPPLY DEVICE AND SWITCHING MODE POWER SUPPLY DEVICE

(71) Applicant: BOLTIER R&D, La Mirada, CA (US)

(72) Inventor: Hun Yong Choe, Cerritos, CA (US)

(73) Assignee: BOLTIER R&D, La Mirada, CA (US)

( * ) Notice: Subject to any disclaimer, the term of this patent is extended or adjusted under 35 U.S.C. 154(b) by 372 days.

(21) Appl. No.: 14/850,507

(22) Filed: Sep. 10, 2015

(65) Prior Publication Data

US 2015/0380982 A1 Dec. 31, 2015

Related U.S. Application Data

(62) Division of application No. 13/846,537, filed on Mar. 18, 2013, now Pat. No. 9,231,437.

(30) Foreign Application Priority Data

Aug. 14, 2012 (KR) .......... 10-2012-0089039
Dec. 7, 2012 (KR) .......... 10-2012-0141809

(51) Int. Cl.
*H02J 9/00* (2006.01)
*H02J 3/02* (2006.01)
*H02M 7/04* (2006.01)
*H02J 7/35* (2006.01)
*H02J 9/06* (2006.01)

(52) U.S. Cl.
CPC ......... *H02J 9/00* (2013.01); *H02J 3/02* (2013.01); *H02J 7/35* (2013.01); *H02M 7/04* (2013.01); *H02J 9/062* (2013.01); *Y02B 10/72* (2013.01); *Y02E 10/566* (2013.01); *Y10T 307/625* (2015.04)

(58) Field of Classification Search
CPC ........ H02J 3/02; H02J 7/35; H02J 9/00; H02J 9/062; H02M 7/04; Y02B 10/72; Y02E 10/566; Y10T 307/625
USPC .......................................................... 307/66
See application file for complete search history.

(56) References Cited

U.S. PATENT DOCUMENTS

| | | | | |
|---|---|---|---|---|
| 5,631,814 A | * | 5/1997 | Zak .......... | H02J 9/061 307/66 |
| 6,100,605 A | * | 8/2000 | Zajkowski ........ | H02J 9/06 307/66 |
| 6,225,708 B1 | * | 5/2001 | Furukawa ........ | G06F 1/30 307/23 |
| 9,000,609 B2 | * | 4/2015 | Pan .......... | G06F 1/26 307/26 |

(Continued)

*Primary Examiner* — Rexford Barnie
*Assistant Examiner* — Toan Vu
(74) *Attorney, Agent, or Firm* — Novick, Kim & Lee, PLLC; Jae Youn Kim

(57) ABSTRACT

Provided is an alternating current (AC) and direct current (DC) power supply device in which normal power and power of a solar cell is used to supply not only AC power but also DC power, particularly, power of a solar cell is first supplied as DC power or is charged in a battery, and after battery charging, residual power is converted to AC power via an inverter so as to replace normal AC power or to transmit AC power to the outside. Accordingly, an SMPS power supply method in which AC and DC power are supplied at the same time may be provided, and moreover, power of a solar cell may be effectively used.

3 Claims, 16 Drawing Sheets

(56) References Cited

U.S. PATENT DOCUMENTS

| | | | |
|---|---|---|---|
| 2005/0073860 A1* | 4/2005 | Yang | H02M 1/4208 363/16 |
| 2006/0087800 A1* | 4/2006 | Savage | G06F 1/263 361/601 |
| 2010/0046129 A1* | 2/2010 | Mikrut | H02H 9/005 361/45 |
| 2010/0122096 A1* | 5/2010 | Ozenc | G06F 1/26 713/300 |

* cited by examiner

AC-DC POWER SUPPLY DEVICE AND SWITCHING MODE POWER SUPPLY DEVICE

CROSS-REFERENCE TO RELATED PATENT APPLICATION

This application is a divisional of U.S. Ser. No. 13/846,537 filed on Mar. 18, 2013, which claims priority to Korean Patent Application Nos. 10-2012-0089039, filed on Aug. 14, 2012, and 10-2012-0141809, filed on Dec. 7, 2012, the disclosures of which are incorporated herein in their entirety by reference.

BACKGROUND OF THE INVENTION

1. Field of the Invention

The present invention relates to an alternating current (AC) and direct current (DC) power supply device, and more particularly, to an AC-DC switching mode power supply (SMPS) device, in which a normal power source applied from the outside is converted to an AC voltage or a DC voltage having a predetermined voltage level and is transmitted to a load without an additional wiring, and in which not only AC but also DC is supplied to the load by using normal power and power of a solar cell; particularly, the power of the solar cell is first supplied as DC power or residual power remaining after charging a battery is converted to AC via an inverter to replace the AC power of the normal power source or to allow the power to be transmitted to the outside. Accordingly, AC and DC power may be supplied simultaneously, and moreover, power of the solar cell may be efficiently used.

2. Description of the Related Art

As the energy and environment crisis has recently increased, power production by using alternative energy sources such as power produced by solar cells and the efficient use of power are emphasized, and the use of solar cells in homes is a trend on the increase. Moreover, techniques for manufacturing power supply devices that are capable of using energy effectively and efficiently by total power management are also increasingly being developed.

In general, a normal power supply consists of a HOT wire (+) via which a high voltage-level AC power is supplied, a neutral wire (−) via which a relatively low voltage-level power is supplied compared to the HOT wire (+), and a ground wire GND provided to prevent harm to humans due to an electric shock or an electric leakage. However, it is difficult to use DC power directly from the normal power supply without a power converter that is suitable for various loading capacities.

Some electric appliances, such as an air conditioner, a washing machine, or a refrigerator, require AC power, but there are also products which use DC power by converting AC power. Most DC power produced by solar cells is converted to AC power for use.

Due to switching loss in converters or inverters for converting AC power to DC power or DC power to AC power, however, loss in power conversion is caused.

However, an AC-DC power supply device according to an embodiment of the present invention may be useful as follows.

For example, since the time range of power consumption is highly concentrated depending on the types of use, homes may conclude a certain contract with a power supply company to transmit a predetermined amount of power that is generated by using solar cells during the daytime to the power supply company via, for example, a grid line connection, and the power may be supplied to industrial or commercial facilities during the time range when a high power consumption is required, and at night when a large amount of power is used temporarily, a portion of the power produced by the solar cells at homes and charged thereby may be used. Consequently, the AC-DC power supply device according to an embodiment of the present invention may function like a huge battery.

KR 2012-0089039, filed by the inventors prior to the present application, discloses an AC-DC power supply device in which a normal power source and a battery are used to simultaneously supply AC and DC power. However, as described above, a system allowing efficient use of an alternative power source generated by a solar cell is additionally required.

SUMMARY OF THE INVENTION

The present invention provides an alternating current (AC) and direct current (DC) power supply device in which a power supplied to a hot wire, a neutral wire, and a ground wire is converted to an AC voltage or a DC voltage having a predetermined voltage level so as to transmit the converted power to a conversion neutral wire and a ground wire.

The present invention also provides an AC-DC power supply device which receives DC power from a solar cell, which is alternative energy, and charges the same in a battery while supplying AC power based on normal power, and supplies power to various electronic appliances that use DC power, and simply converts AC power to DC power when electricity runs out.

The present invention also provides an AC-DC switching mode power supply (SMPS) device in which power produced by solar cells is converted to AC after battery charging is completed by alternative energy produced by the solar cells and when power consumption is low, so that a predetermined voltage level is set for a wire of a normal power supply to transmit the AC power to an electric power company via a grid line.

According to an aspect of the present invention, there is provided an AC-DC power supply device for converting normal power input through a hot wire, a neutral wire, and a ground wire to supply AC power between the hot wire and the neutral wire and between the hot wire and the ground wire and to supply DC power between a conversion neutral wire and the ground wire. In addition to the applied power, the AC-DC power supply device may include a capacitor, a first switch, a second switch, a battery, and an SMPS device. The capacitor may include a first terminal connected to the neutral wire and a second terminal connected to the conversion neutral wire. The first switch may be connected to two ends of the capacitor. The second switch may include a first terminal connected to the conversion neutral wire.

The battery may include a positive terminal connected to a second terminal of the second switch and a negative terminal connected to the ground wire. The SMPS device may convert power applied to the hot wire to a DC voltage having a predetermined voltage level, and supply the DC voltage to a common terminal of the second switch and the rechargeable battery, a battery negative terminal of DC power applied to the conversion neutral wire, and the ground wire.

According to another aspect of the present invention, there is provided an AC-DC switching mode power supply (SMPS) device including: an SMPS device for receiving normal AC power from a hot wire, a neutral wire, and a ground wire to connect the normal AC power to an AC output terminal of a battery via a terminal GND; an electromagnetic interference (EMI) circuit for converting AC power applied to the AC output terminal of the battery to DC power; a power factor correction (PFC) circuit for applying the applied DC power to drains of switching devices via a low pass filter; an SMPS circuit for applying DC power to a drain of the switching device and oscillating an integrated circuit to trigger gates of the switching devices, wherein the switching devices are serially connected to switch DC power applied to the drains of the switching devices to a primary side of a transformer; a maximum power point tracking (MPPT) circuit in which the DC voltage supplied to the SMPS circuit passes through a sensing resistor, and input DC power from the outside to an CN401PV input terminal is connected to drains of switching devices; a programming circuit including an IC that controls a circuit operation by setting a current flowing through sensor resistors in accordance with programmed data and allows to monitor an operating state of the circuit through a network; a constant voltage circuit for supplying stable IC power to an inverter; an inverter PFC circuit for converting DC voltage to AC voltage so as to increase a voltage; an inverter stage circuit for converting input DC power to AC power; and a refrigerator module that uses AC power in a normal condition when normal AC power is input, and receives AC-DC power in the event of a power failure to operate a refrigerator.

Also, the SMPS device may generate not only AC power having a necessary voltage level but also DC power by using normal AC power and power of a solar cell.

The SMPS device may further include a battery that is charged by receiving power from a solar cell.

The refrigerator module may include: a PFC circuit for receiving DC power through an AC-DC power line, wherein the DC power supplied to a drain via a transformer flows to a source to rectify and convert AC power to DC power, and smoothes and outputs the DC power to a stage circuit; and the stage circuit including an AC-DC power input unit, wherein ICs oscillate phases thereof to sequentially trigger gates of switching devices to convert DC power supplied to drains of the switching devices to AC power and output the AC power, and when power is normally supplied, AC power input to a power plug is output to a socket to operate an electronic appliance, and when a power failure occurs, the electronic appliance automatically converts DC power to AC power and outputs the AC power to the socket so that power is supplied even in the event of a power failure.

The PFC circuit may include a boost diode for supplying sufficient power.

The programming circuit may first supply solar cell power via programming, and supply insufficient power from normal AC power to the SMPS circuit, and when solar cell power is input after charging is completed, power may be supplied to the inverter to convert the power to AC power and transmit the AC power to the outside, and to stop the SMPS circuit.

The MPPT circuit may include a sensor resistor for sensing a current of DC power flowing through a load circuit, and the AC power supplied to the EMI circuit may be supplied to rectification diodes after passing through a fuse, an inductor, an inductor, and a low pass filter.

The AC-DC power input unit may output normal AC power that is input to a the relay switch when power is normally supplied, to the socket so as to operate the refrigerator module, and a refrigerator module relay switch may be automatically converted in the event of a power failure so as to convert DC power input to the relay switch to AC power and output the AC power to the socket.

The MPPT circuit may charge a battery in accordance with data, together with the SMPS circuit, and outputs required DC power to an AC-DC power line together with the battery.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
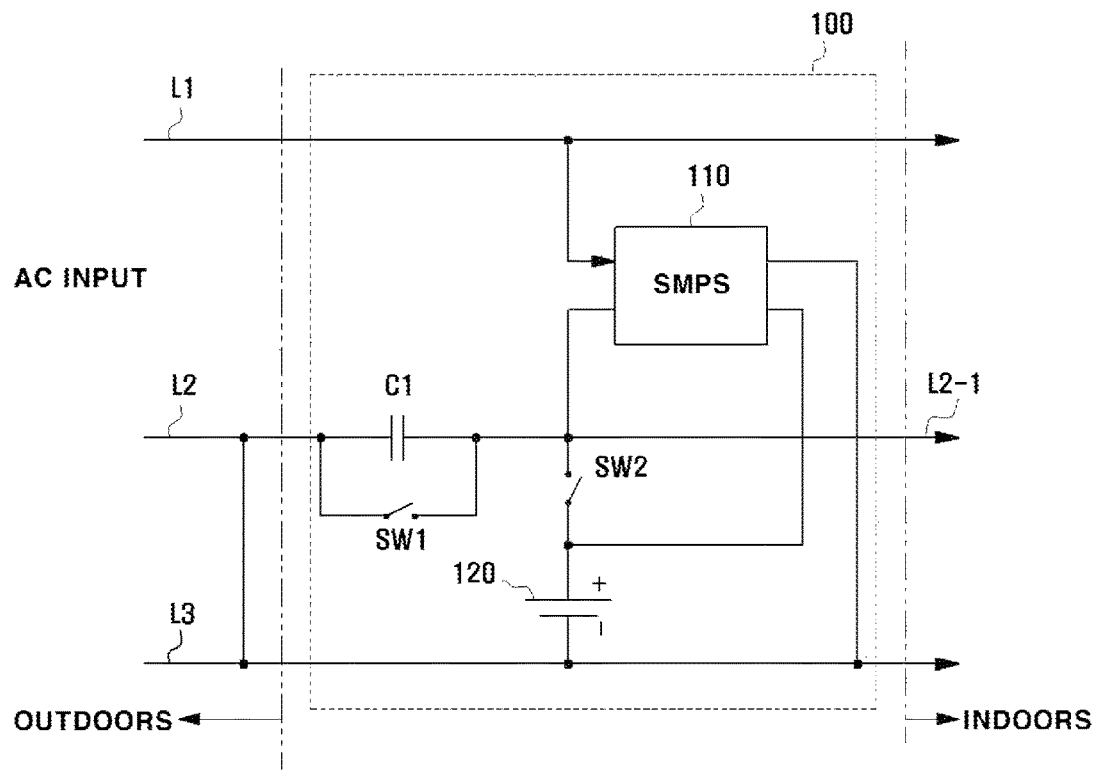
FIG. 1 is a circuit diagram illustrating an alternating current (AC) and direct current (DC) power supply device according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. Like reference numerals in the drawings denote like elements.

While particulars such as details elements are described below, these are provided for overall understanding of the present invention, and it should be noted that the invention may also be implemented without these particulars.

In the description of the present invention, certain detailed explanations of the related art or structures are omitted when it is deemed that they may unnecessarily obscure the essence of the invention.

A power supply is typically classified into a linear type power supply and a switching type power supply.

A switching type power supply device, which is also referred to as a switching mode power supply (SMPS) device, first converts alternating current (AC) into direct current (DC), and then converts the DC into high-frequency AC of several tens of KHz, and drops a voltage of the AC by using a high-frequency transformer such as a Ferrite transformer, and then rectifies and smoothes the AC whose voltage is dropped to thereby obtain a required power.

Since a small capacity of a transformer or a capacitor is allowed in the switching type power supply device, the efficiency of the switching type power supply device is generally better than that of the linear type power supply device. Although the switching type power supply device includes complex peripheral components and noise is generated when switching is conducted, since the efficiency of the switching type power supply device is higher than a linear type, the SMPS device is selected for not only large charging batteries used in TVs, PCs, or laptops but also in small rechargeable batteries.

According to the present invention, a power supply device capable of generating not only normal power in the form of AC power having a required voltage level but also DC power by using the SMPS device and a battery is provided.

FIG. 1 is a circuit diagram of a power supply device 100 according to an embodiment of the present invention.

Referring to FIG. 1, the power supply device 100 includes a capacitor C1, a first switch SW1, a second switch SW2, a rechargeable battery 120, and an SMPS device 110. The power supply device 100 converts normal power that is applied through a hot wire L1, a neutral wire L2, and a ground wire L3 to supply AC power between the hot wire L1 and the neutral wire L2 and between the hot wire L1 and the ground wire L3 and DC power between a conversion neutral wire L2-1 and the ground wire L3.

The capacitor C1 includes a first terminal connected to the neutral wire L2 and a second terminal connected to the conversion neutral wire L2-1. The first switch SW1 is connected parallel to the capacitor C1. A first terminal of the second switch SW2 is connected to the conversion neutral wire L2-1.

The rechargeable battery 120 includes a positive (+) terminal that is connected to a second terminal of the second switch SW2 and a negative (−) terminal that is connected to the ground wire L3.

The SMPS device 110 converts power applied to the hot wire L1 to DC power having a predetermined voltage level and supplies the same to a common terminal of the second switch SW2 and the rechargeable battery 120, a DC power negative terminal connected to the conversion neutral wire L2-1, and the ground wire L3.

The capacitor C1 allows the AC power applied to the neutral wire L2 to pass through the conversion neutral wire L2-1 but blocks the DC power applied to the conversion neutral wire L2-1 from flowing to the neutral wire L2.

A voltage level of the rechargeable battery 120 may be determined depending on where power is used. The voltage level of the rechargeable battery 120 may be preferably, for example, 12 V or 24 V. In order to increase a use capacity of the rechargeable battery 120, a desired number of rechargeable batteries may be connected in parallel.

While normal power is being applied, the rechargeable battery 120 stores electrical energy, and when a power failure occurs, the electrical energy stored in the rechargeable battery 120 is supplied to connected electric appliances.

A left side of the power supply device 100 of FIG. 1 indicates outdoors to which normal power AC input is supplied, and a right side of the power supply device 100 indicates indoors where normal power AC INPUT is converted to supply AC power between the hot wire L1 and the neutral wire L2 via the ground wire L3 that is connected to the neutral wire L2 and to supply DC power between the conversion neutral wire L2-1 and the ground wire L3.

The first switch SW1 is used to protect a light-emitting diode (LED) lamp which receives power from the conversion neutral wire L2-1 in the case when the rechargeable battery 120 is changed or inspected. In this case, the first switch SW1 is turned on so as to connect the conversion neutral wire L2-1 to the ground wire L3.

Hereinafter, the AC-DC SMPS device as a power supply device 100 of the current embodiment of the present invention will be described.

The present invention provides an AC-DC SMPS device, in which power is supplied from a power supply that supplies AC and DC power at the same time, in a similar manner as an AC-DC power supply device disclosed in KR 10-2012-0089039 that is filed by the inventors prior to the present application. In detail, an SMPS circuit 110-3 illustrated in FIG. 5C according to the present invention generates not only AC power having a required voltage level but also DC power by using normal AC power and power from solar cells, which are alternative energy sources, and minimizes power loss.

Figure 2:
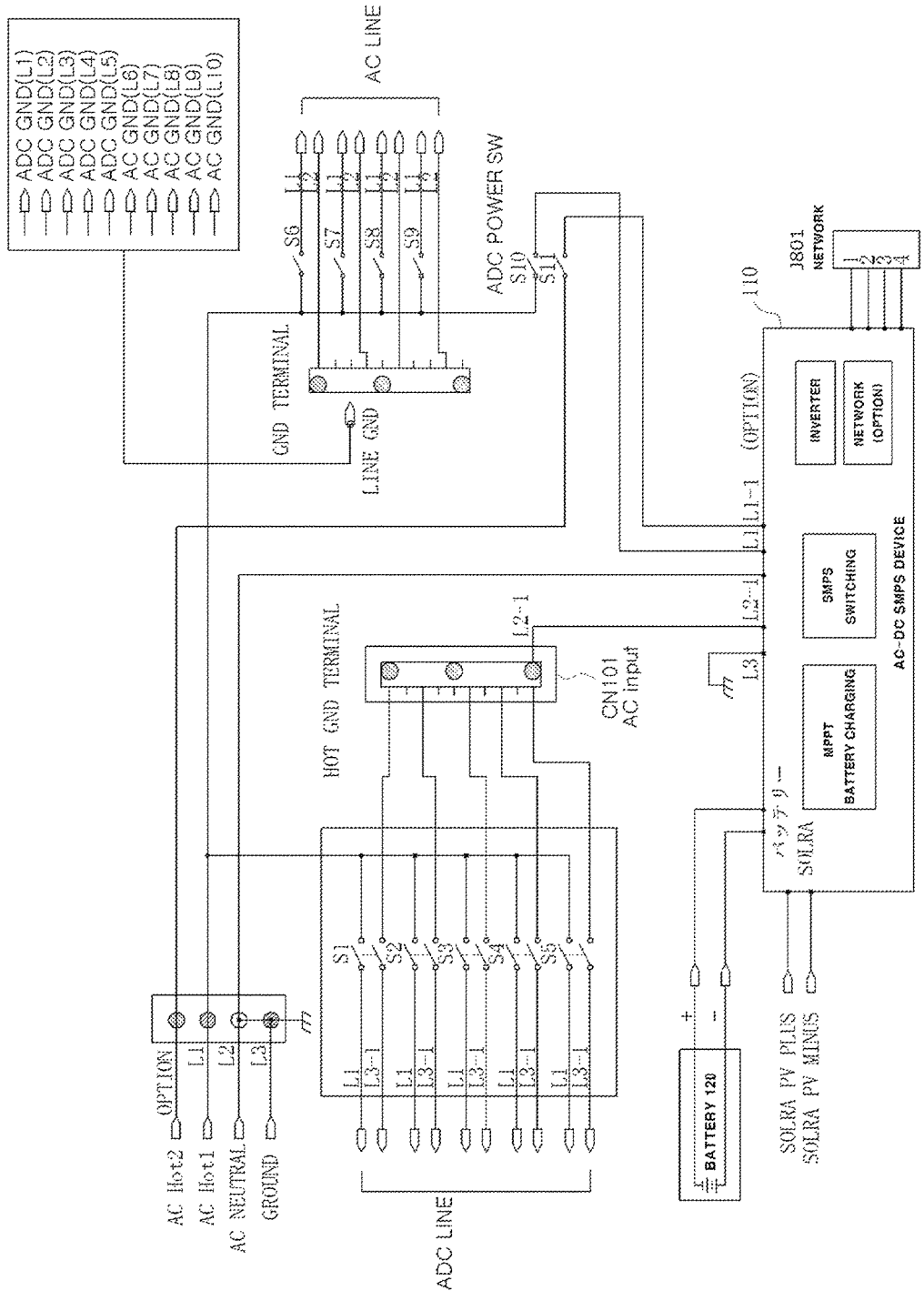
FIG. 2 is a circuit diagram of a peripheral circuit of an AC-DC switching mode power supply (SMPS) device according to an embodiment of the present invention.
Figure 3:
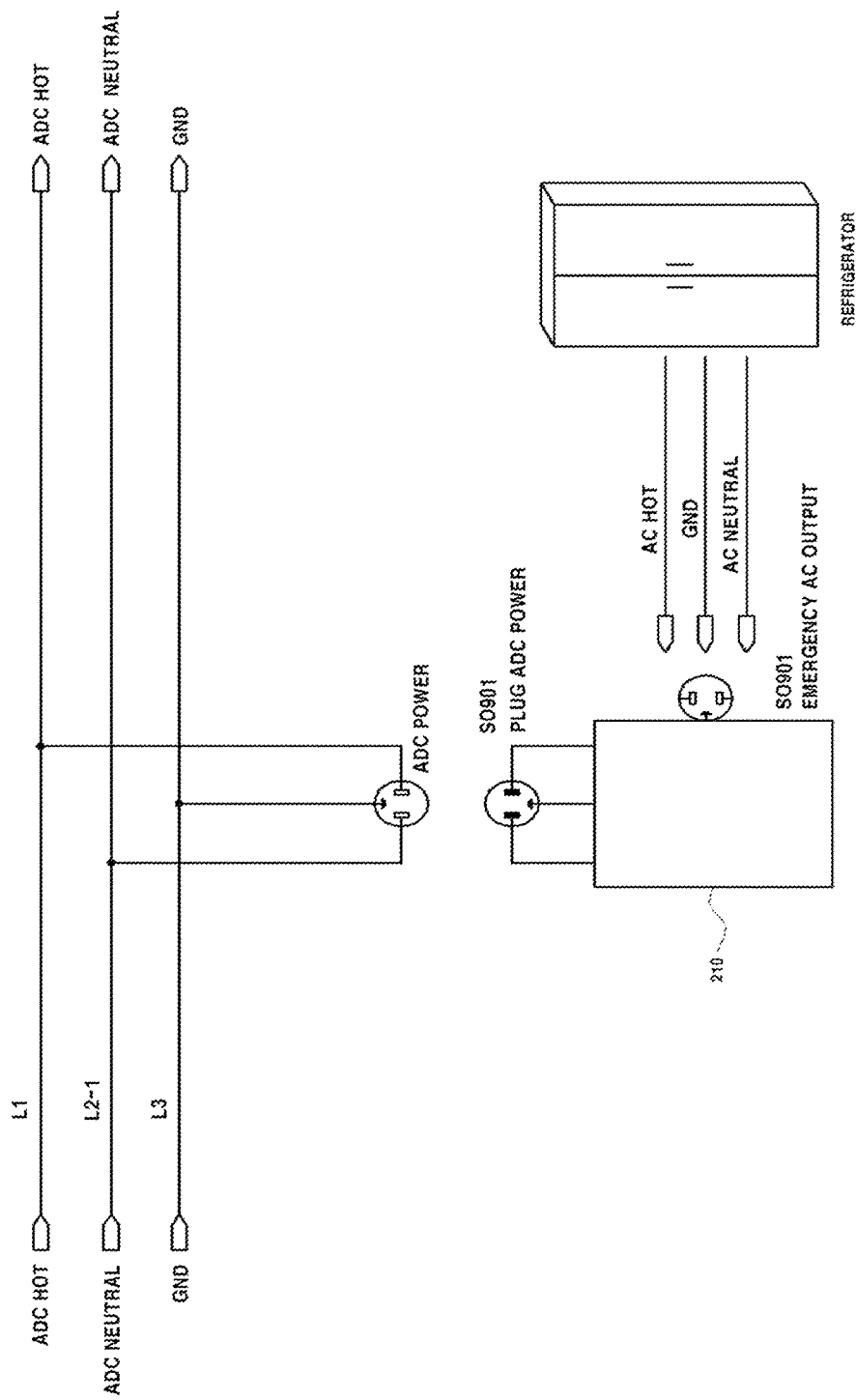
FIG. 3 is a module diagram of a refrigerator as a peripheral circuit of an AC-DC SMPS device according to an embodiment of the present invention.
Figure 4:
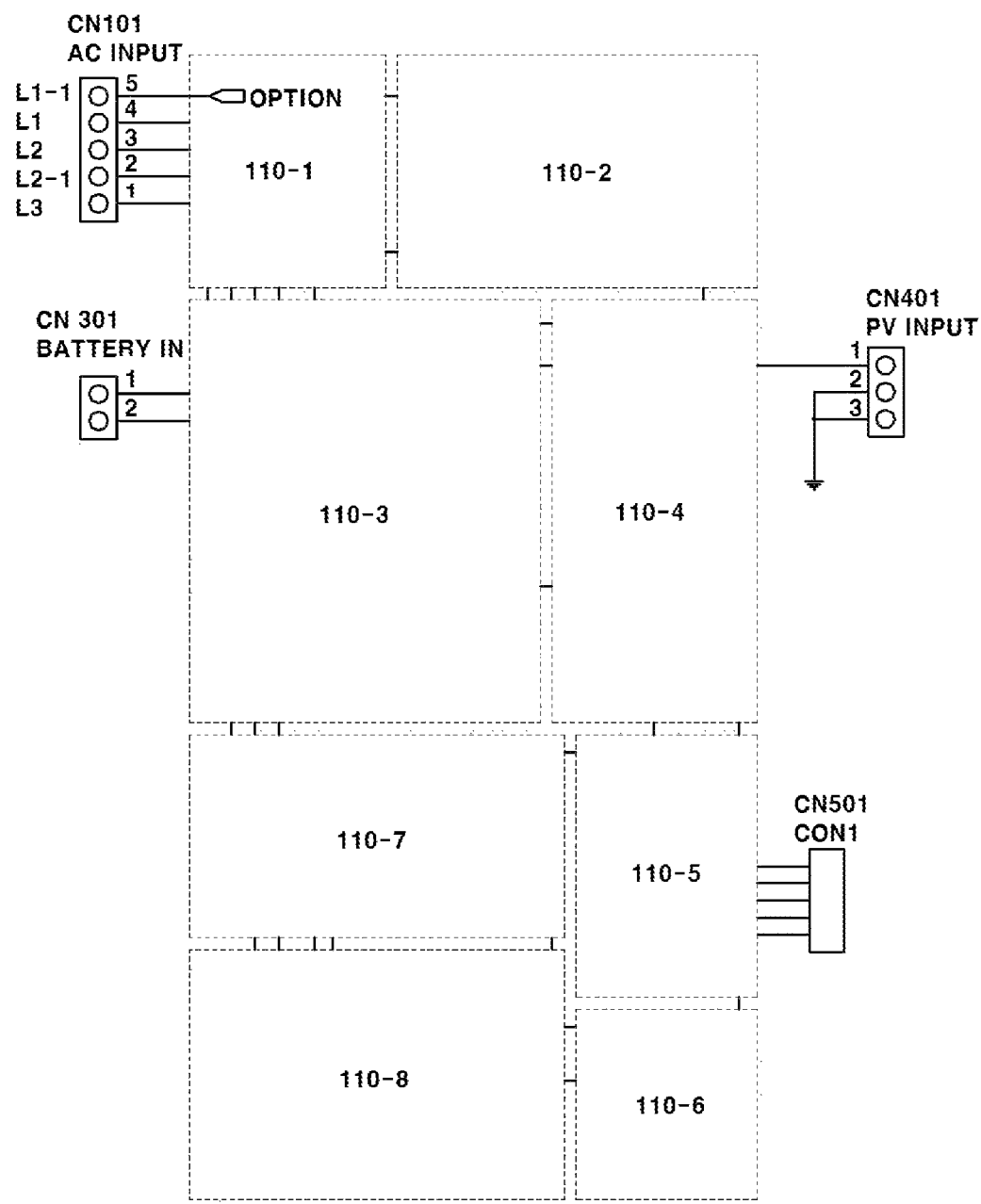
FIG. 4 is a block diagram illustrating an AC-DC SMPS device according to an embodiment of the present invention.

Referring to FIGS. 2, 3, and 4, an AC-DC SMPS device receives normal AC power through the hot wire L1, the neutral wire L2, and the ground wire L3, and is connected to an AC input hot ground terminal CN101 AC INPUT via an AC-DC power switch S10, an AC neutral terminal NEUTRAL, and a ground terminal GND of FIG. 2.

Also, the rechargeable battery 120 is connected to a terminal IN of a battery CN301 of FIG. 4, and AC-DC power is applied to an internal wire through a terminal #2 of the AC input hot ground terminal CN101 after passing through the ground terminal GND and a terminal HOT GND TERMINAL. A terminal #5 of the AC input hot ground terminal CN101 denotes a terminal for countries where a three-wire system is used, and is optionally included.

The AC-DC SMPS device may be connected such that an alternative energy source such as solar cell power is input through a terminal CN401 PV INPUT of FIG. 4, or connected to a power source of a vehicle or other DC power sources in an emergency. CN501 of FIG. 4 denotes a terminal for program updates and a network connection of the AC-DC SMPS device.

FIGS. 5A through 5H are detailed circuit diagrams of an AC-DC power supply device according to an embodiment of the present invention.

Figure 5A:
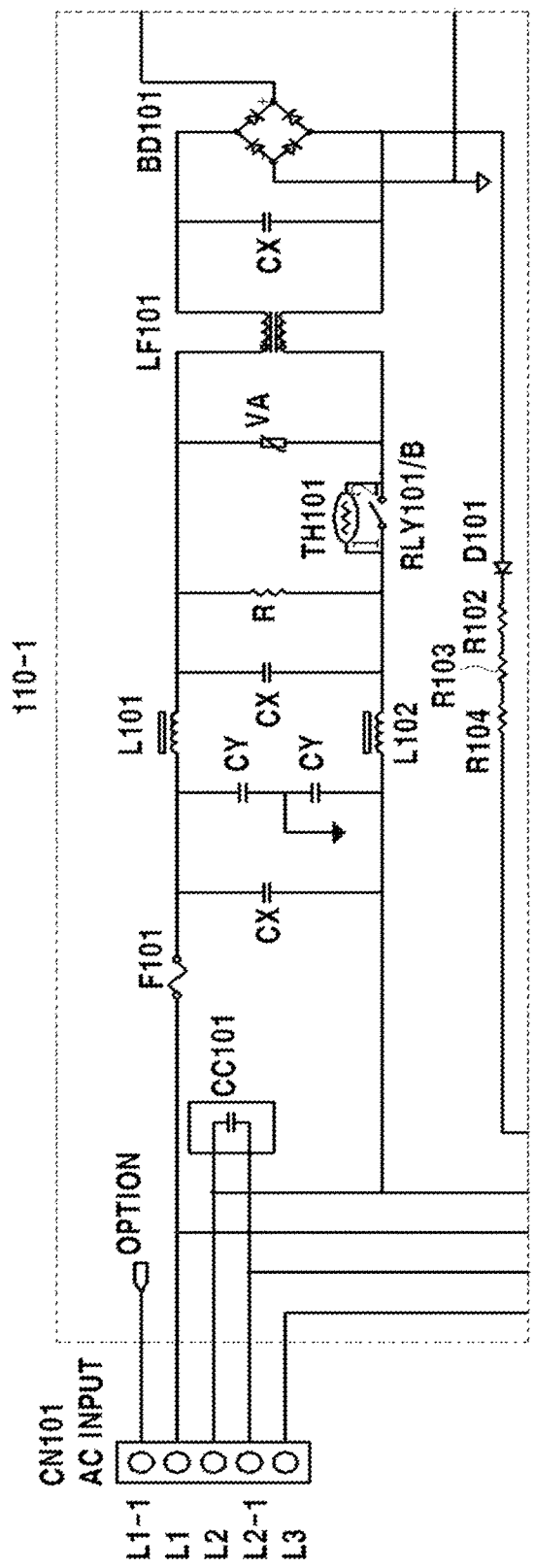
FIGS. 5A through 5H are detailed circuit diagrams of a AC-DC power supply device according to an embodiment of the present invention.

Referring to FIG. 5A, AC power is supplied through terminals #3 and #4 of an AC input hot ground terminal CN101 in an electromagnetic interference (EMI) circuit 110-1. A terminal #1 of the AC input hot ground terminal CN101 allows AC power to pass through to be supplied to an AC-DC power line. The AC power applied to the EMI circuit 110-1 is applied to a rectification diode BD 101 after flowing through a fuse F101, an inductor L101, an inductor L102, and a low-pass filter LF101.

Here, power that has passed through the inductor L102 passes through a circuit consisting of a relay RLY101/B and a thermistor TH101; this circuit blocks power if an overload is generated. The rectification diode BD101 converts the AC power to DC power and outputs the same to a power factor correction (PFC) circuit 110-2.

Figure 5B:
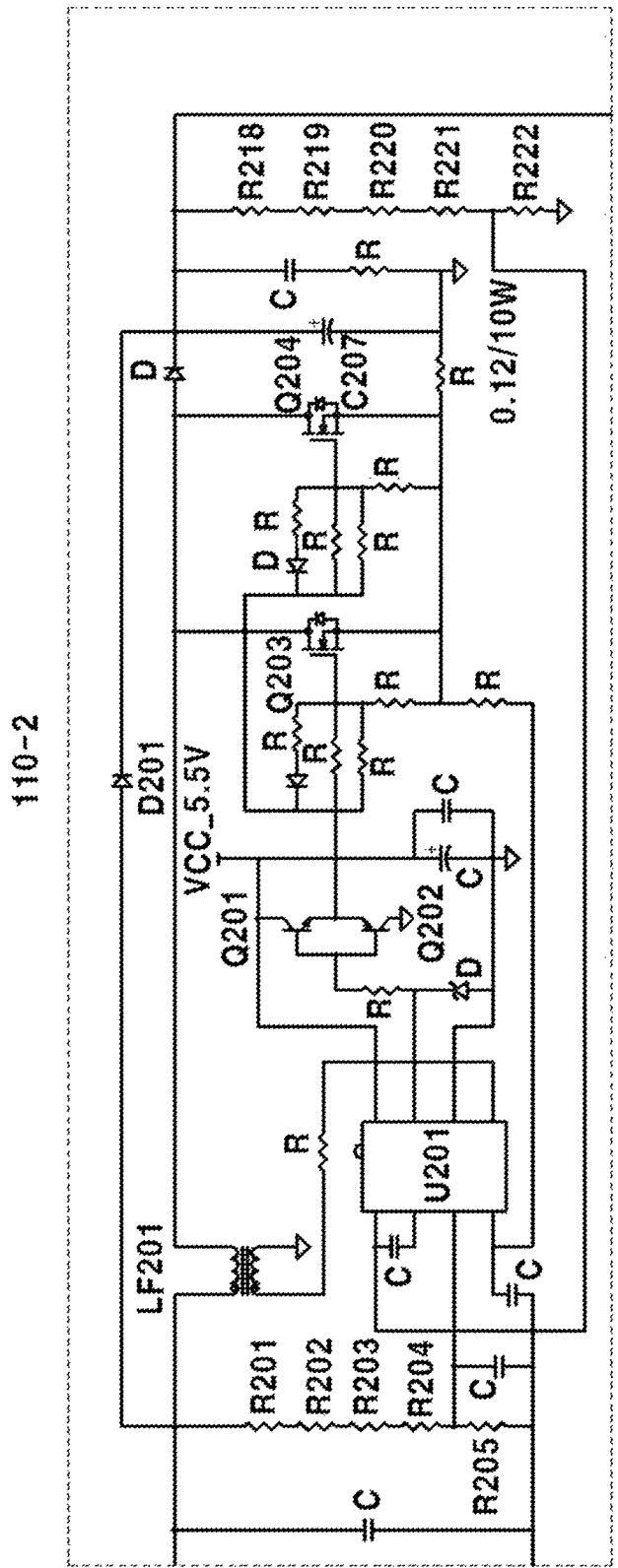

Referring to FIG. 5B, the PFC circuit 110-2 applies the DC power to drains of switching device Q203 and Q204 through a low-pass filter LF201. R201, R202, R203, and R204 denote resistors for a voltage drop, which supply a comparison voltage to an integrated circuit (IC) U201 together with a resistor R205.

D201 denotes a boost diode for supplying a sufficient current, and the IC U201 receives the comparison voltage through an output terminal thereof to output an oscillation voltage in accordance with a predetermined time constant so as to trigger gates of the switching devices Q203 and Q204 through switching device Q201 and Q202. Then, DC power of about 380 V is boosted up and output through two terminals of a capacitor C207. R218, R219, R220, and R221 denote resistors for a voltage drop, which are designed to supply a comparison voltage of an output terminal of the IC U201 together with a resistor R222.

Figure 5C:
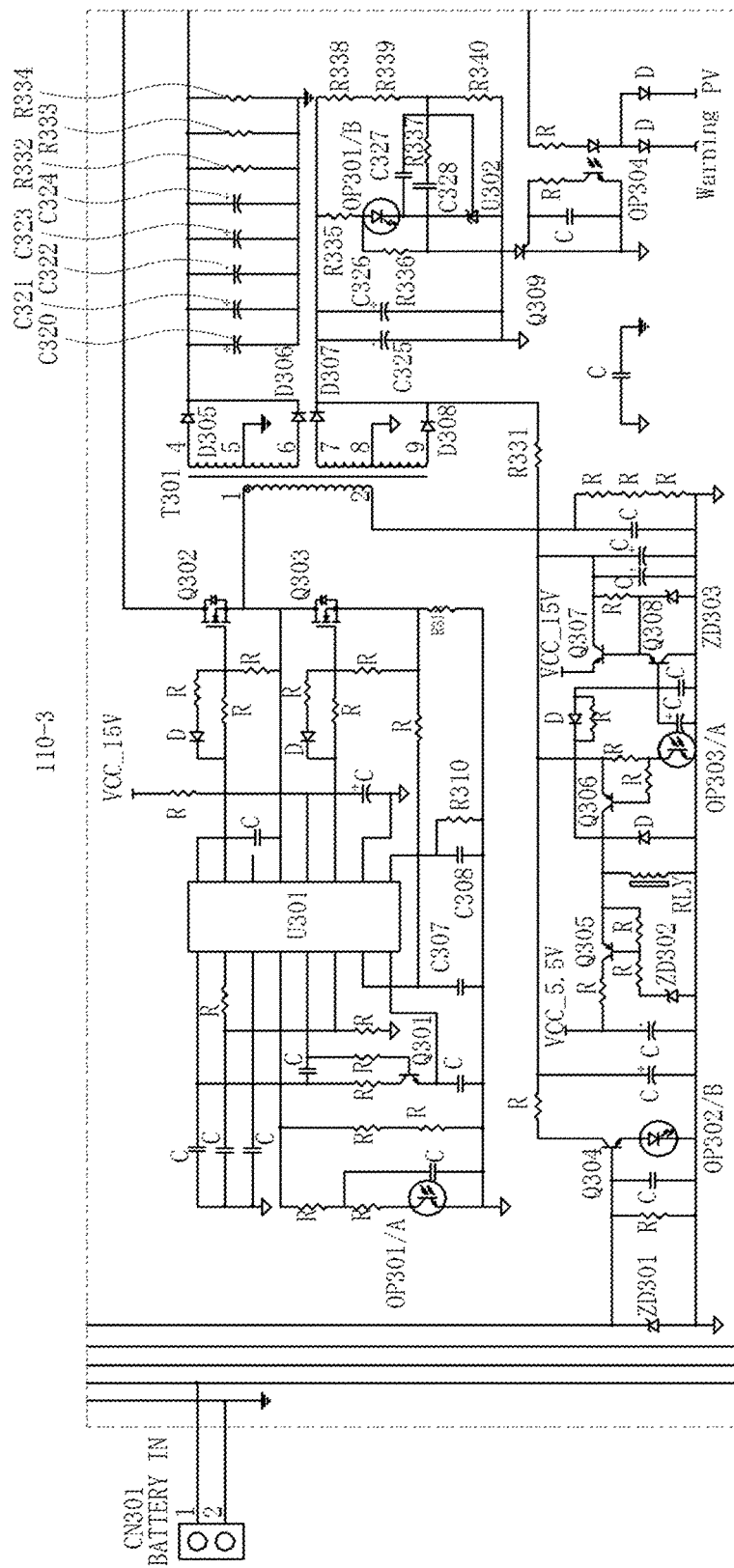

Referring to FIG. 5C, DC power applied to the SMPS circuit 110-3 is applied to a drain of a switching device Q302 and oscillates in an IC U301 to trigger gates of switching device Q302 and Q303, wherein the switching devices Q302 and Q303 are serially configured to switch DC power applied to drains of the switching devices Q302 and Q303 to a primary side of a transformer T301.

AC power that is output through terminals #4, #5, and #6 of a secondary side of the transformer T301 is rectified by full-wave rectification by using diodes D305 and D306, and is separately smoothed to capacitors C320, C321, C322, C323, and C324 to thereby output the same as DC power for charging. R332, R333, and R334 denote protection resistors.

The AC power that is output through terminals #7, #8, and #9 of the transformer T301 is rectified by full-wave rectification by using diodes D307 and D308, and is smoothed to capacitors C325 and C326, and a circuit OP301/B is turned on or off in accordance with time constants of an IC U302, capacitors C327 and C328, and resistors R335, R336, and R337, and resistors R338, R339, and R340 so as to switch the circuit OP301/A and to adjust an oscillation voltage of the IC U301, thereby outputting stable DC power for charging.

A Zener diode ZD301 rectifies the AC power applied to the EMI circuit 110-1 by using a diode a rectification diode D101 by half-wave rectification, and supplies the voltage that is dropped by the resistors R102, R103, and R104 through a section from Q304 to R320, as a U301 start voltage, and supplies DC power of VCC_15V supplied from the secondary side of the transformer T301 to a switching device Q307 via a resistor R331, and supplies power of VCC_5.5V to the ICs U201 and U301 through switching devices Q306 and Q307. Q309 and OP304 each denote an AC power supply adjustment circuit.

Figure 5D:
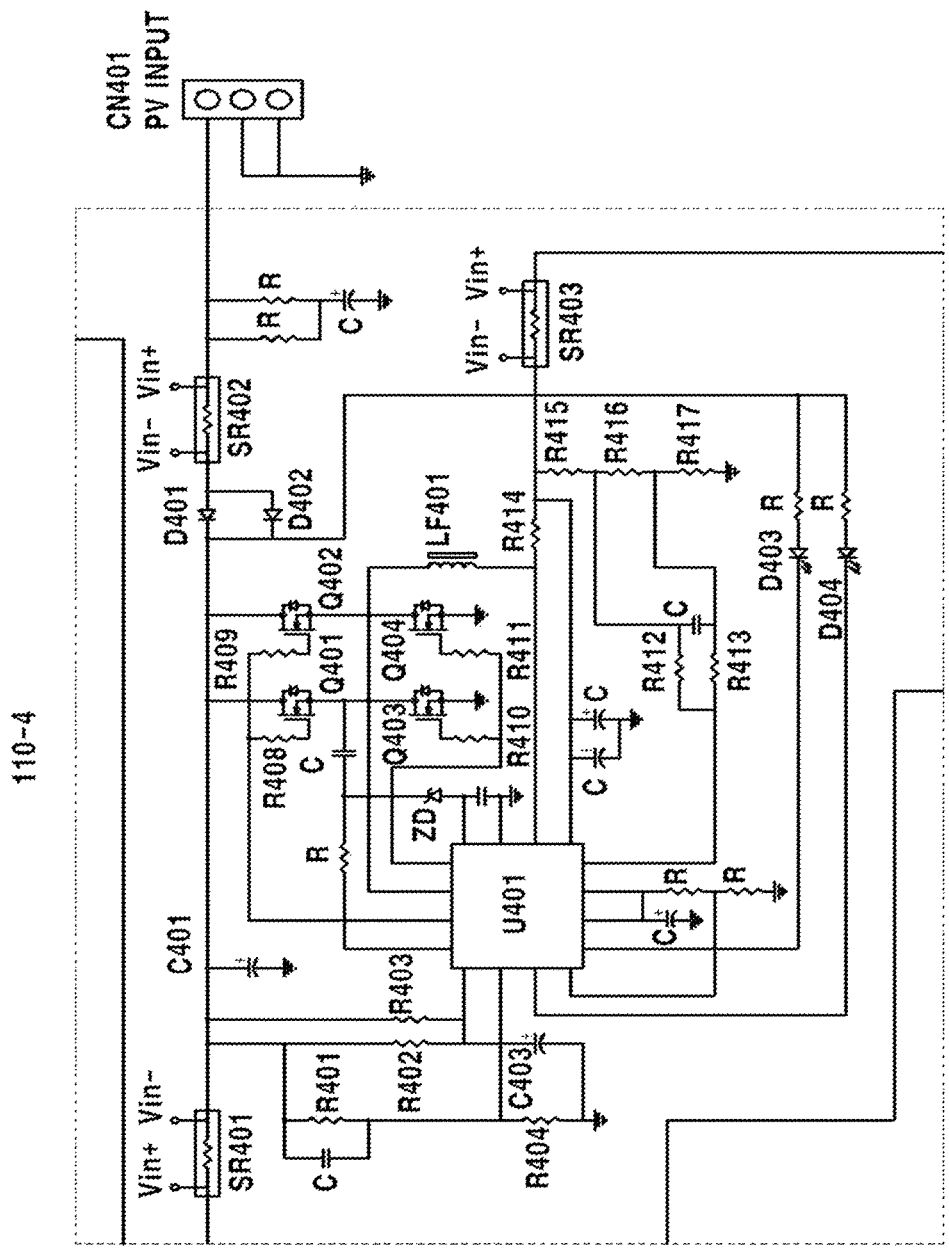

Referring to FIG. 5D, in a maximum power point tracking (MPPT) circuit 110-4, a charging DC voltage applied to the SMPS circuit 110-3 is passed through a sensing resistor SR401, and external input DC power applied through a terminal PV INPUT of a battery CN401, such as solar cell power or power from a power source of a vehicle, passes through a section from the sensing resistor SR402 to diodes D401 and D402 to be applied to drains of switching devices Q401 and Q402. The switching device Q401 is connected serially between a switching device Q403 and the ground terminal GND, and the switching device Q402 is connected to a switching device Q404.

An IC U401 charges the power applied to the SMPS circuit 110-3 and external input DC power in a battery connected to a load circuit, in accordance with programmed data, and outputs required DC power to an AC-DC power line at the same time together with the battery.

R401 and R404 denote MPPSET time constant division resistors, and R402 and R403 denote resistors that supply power to the IC U401, and the IC U401 oscillates in accordance with predetermined time constants so as to trigger gates of the switching devices Q401, Q402, Q403, and Q404 via resistors R408, R409, R410, and R411 and output the DC power applied to the drains of the switching devices Q401, Q402, Q403, and Q404 through a low-pass filter LF 401 and through a section from a resistor R414 to a resistor sensor resistor SR403 as described above.

R414 denotes a sensing resistor that senses a current flowing through the load circuit, and R415, R416, and R417 denote time constant division resistors, and R412 and R413 denote time constant resistors.

D403 and D404 denote LED diodes that indicate a charging state, and SR403 denotes a resistor sensor resistor for sensing a current of DC power flowing through the load circuit.

Figure 5E:
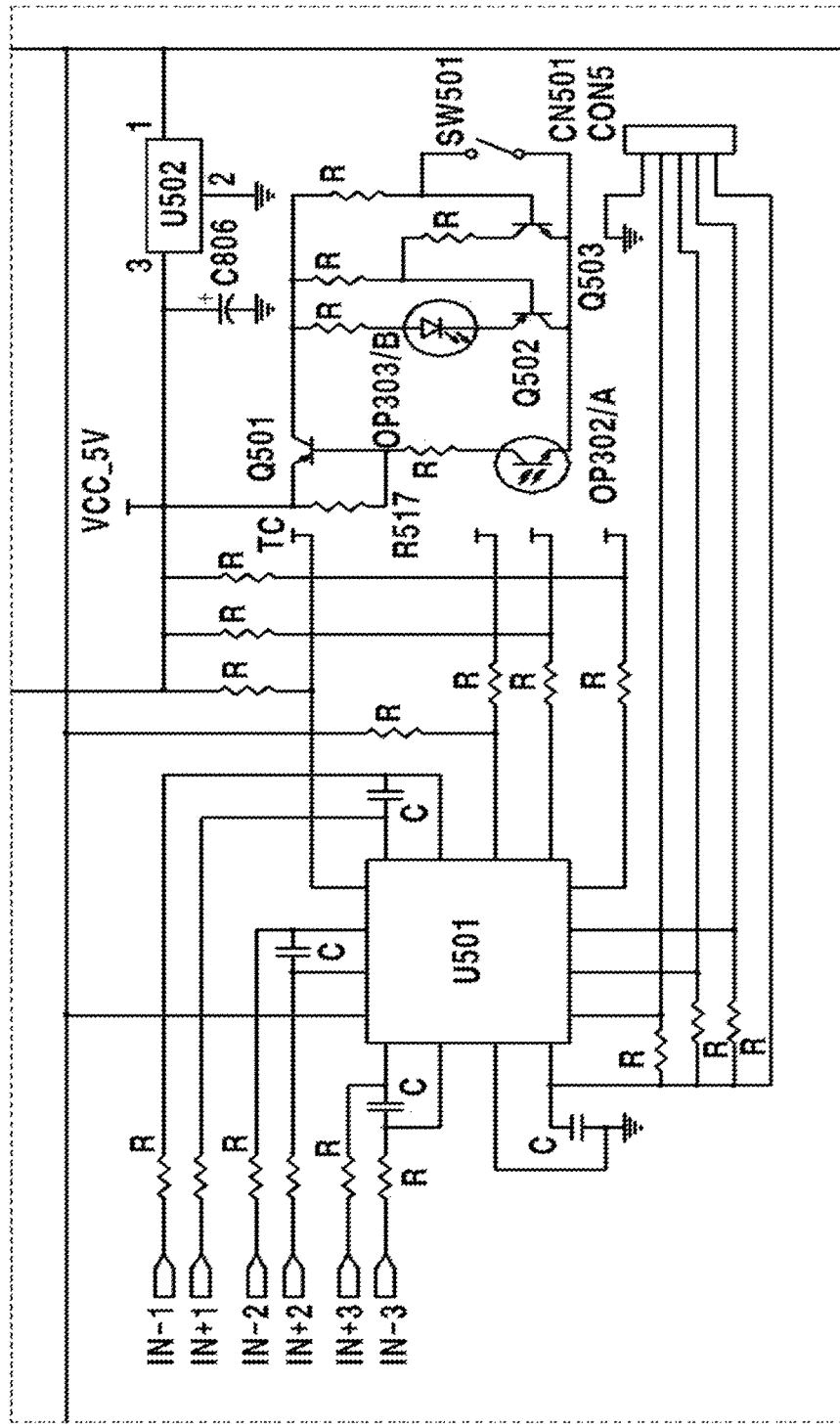

Referring to FIG. 5E, in a programming circuit 110-5, an IC U501 controls an operation of a circuit by setting a current flowing in current sensing resistors according to programmed data so as to enable monitoring of an operating condition of the circuit through a network.

U502 denotes a regulator voltage drop integrated circuit (IC) for power supply, and a switching device Q501 supplies power for power switching to circuits OP302/A and OP303/B. When a switch SW501 is turned on, switching devices Q503 and Q502 are driven to turn on a circuit OP303/B so as to operate a circuit OP302/A, thereby supplying power to the SMPS circuit 110-3 and operating the relay RLY101/B, as has been described above.

External input power, that is, solar cell power, is first supplied via programming, and insufficient power is supplied from normal AC power through the SMPS circuit 110-3, and when solar cell power is input after charging is completed, power is supplied from an inverter and converted to AC power, thereby transmitting the same to the outside. Here, the SMPS circuit 110-3, which uses normal AC power, is stopped through the AC power supply adjustment circuits Q309 and OP304 as described above.

In addition, if solar cell power is not input, power is not supplied to the inverter INVERTER so as to prevent consumption of battery power.

Figure 5F:
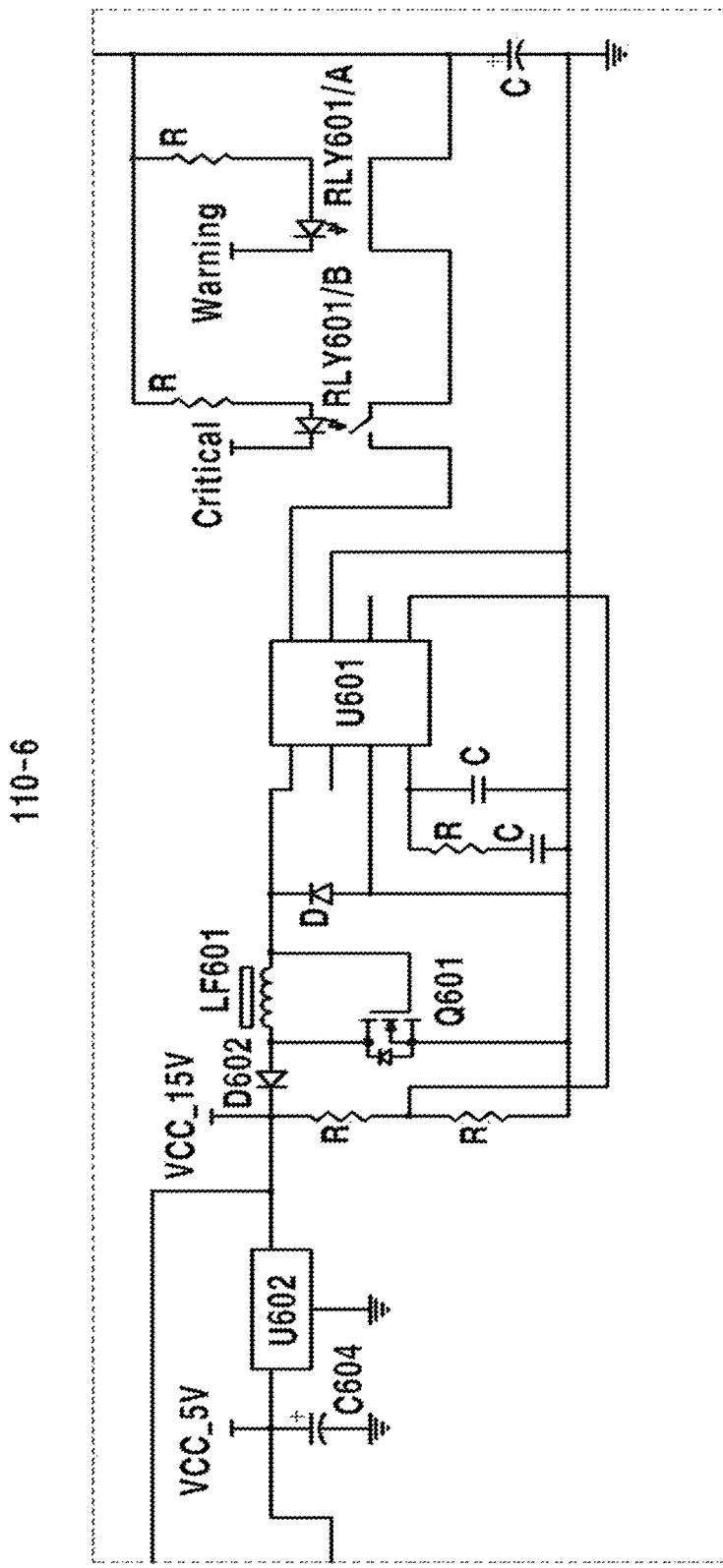

FIG. 5F illustrates a constant voltage circuit 110-6, which is a power supply circuit for supplying stable IC power to an inverter. As described above, RLY601 denotes an electronic relay for switching to control the inverter. U601 denotes an oscillation IC for boosting up power, which triggers a gate of a switching device Q601 to supply VCC_15V to a rear terminal of a diode D602, and an IC U602 drops VCC_15V to VCC_5C and supplies the same.

Figure 5G:
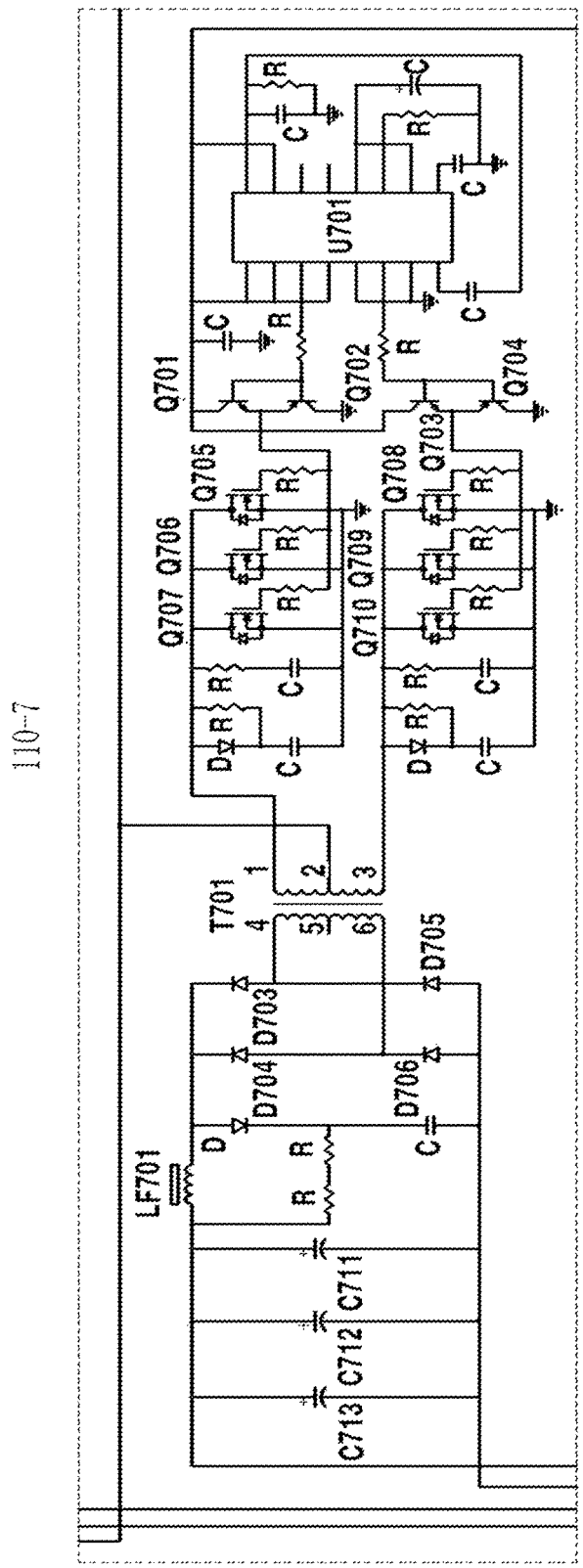

FIG. 5G illustrates an inverter PFC circuit 110-7, which is a voltage enhancing circuit for converting DC 24V to AC 120V or AC 220V. An IC U701 oscillates in accordance with predetermined time constants so as to trigger gates of switching devices Q705, Q706, Q707, Q708, Q709, and Q710 through switching devices Q701, Q702, Q703, and Q704.

Here, DC power applied to drains of the switching devices Q705, Q706, Q707, Q708, Q709, and Q710 is switched between sources thereof to be applied to a primary side of a transformer T701, and a high AC voltage is obtained at a secondary side thereof, and the AC voltage is rectified by using diodes D703, D704, D705, and D706 to be converted to DC. The DC is smoothed through a low pass filter LF701 for capacitors C711, C712, and C713 to be output.

Figure 5H:
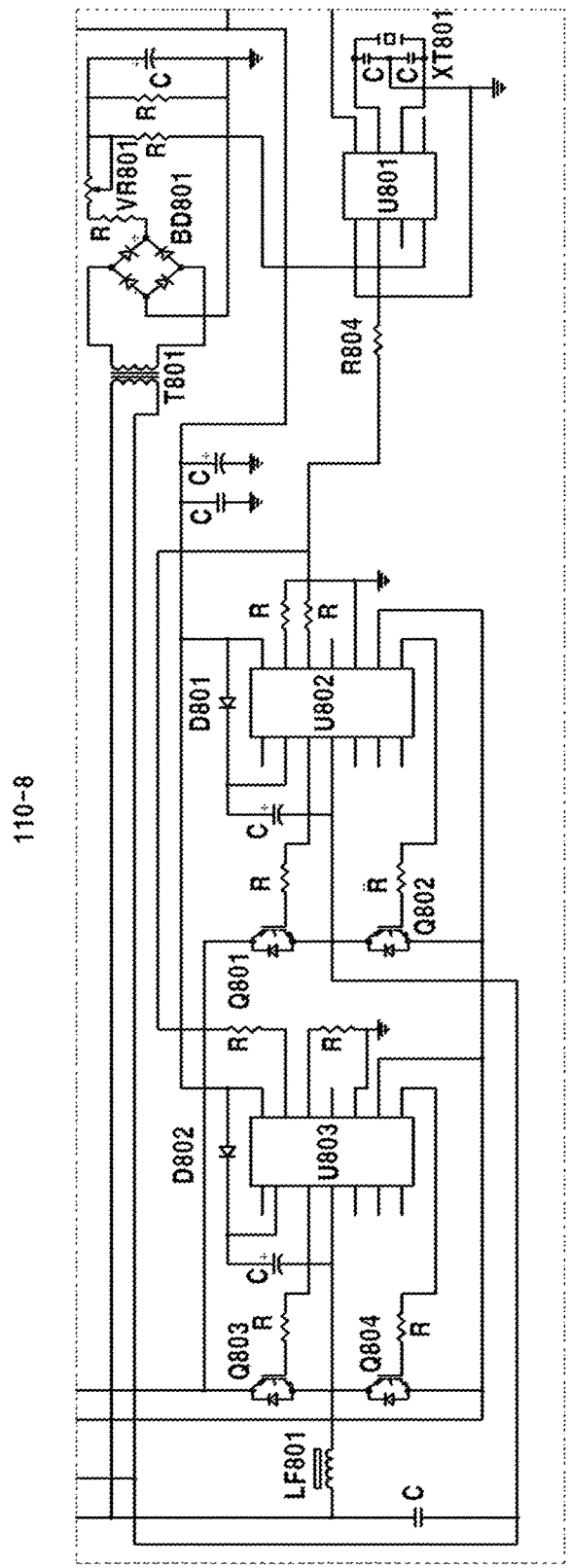

FIG. 5H illustrates an inverter stage circuit 110-8, which is a circuit converting input DC power to AC power. In order to obtain an effect of putting small powers generated in various spots together, a uniform frequency has to be used, and here, an AC frequency of conventional normal AC power is used.

The voltage is dropped by using a transformer T801, and is separated between a primary side and a secondary side of the transformer T801. Power is divided into a (+) component and a (−) component by using a diode D801, and a waveform of the power is corrected using a resistor to supply the same as a synchronization signal to an IC U801, and the IC U801 outputs an oscillation voltage of 60 Hz using a crystal oscillator XT801 so as to oscillate ICs U802 and U803.

Here, oscillation voltages of the ICs U802 and U803 are supplied after respectively converting phases of the oscillation voltages to output oscillation, and the IC U802 triggers gates of the ICs Q801 and Q802, and the IC U803 triggers gates of switching devices Q803 and Q804 to sequentially switch DC power applied to drains of the switching devices Q803 and Q804 so as to convert the same to AC power, and the AC power is output through a low pass filter LF801.

Figure 6:
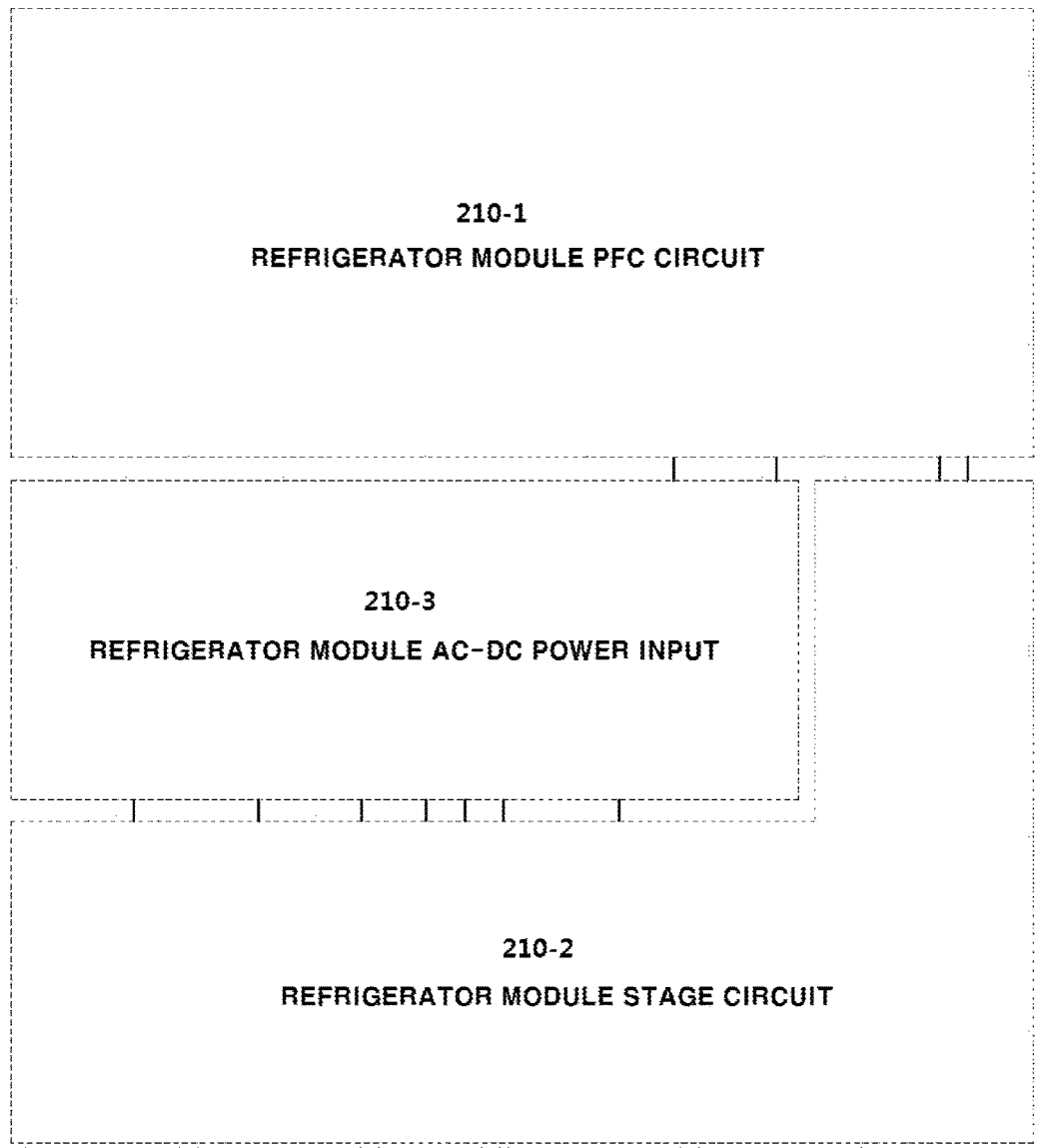
FIG. 6 illustrates an AC-DC SMPS device according to another embodiment of the present invention.

A refrigerator module 210 illustrated in FIG. 6, which is an example of an AC-DC SMPS device according to the present invention, is a circuit for driving a refrigerator in the event of a power failure. If normal AC power is input, a refrigerator is driven by using AC power, and in an emergency such as a power failure, the refrigerator is automatically converted to receive AC-DC power to operate.

The refrigerator module 210 of FIG. 6 will be described further in detail below.

Figure 7A:
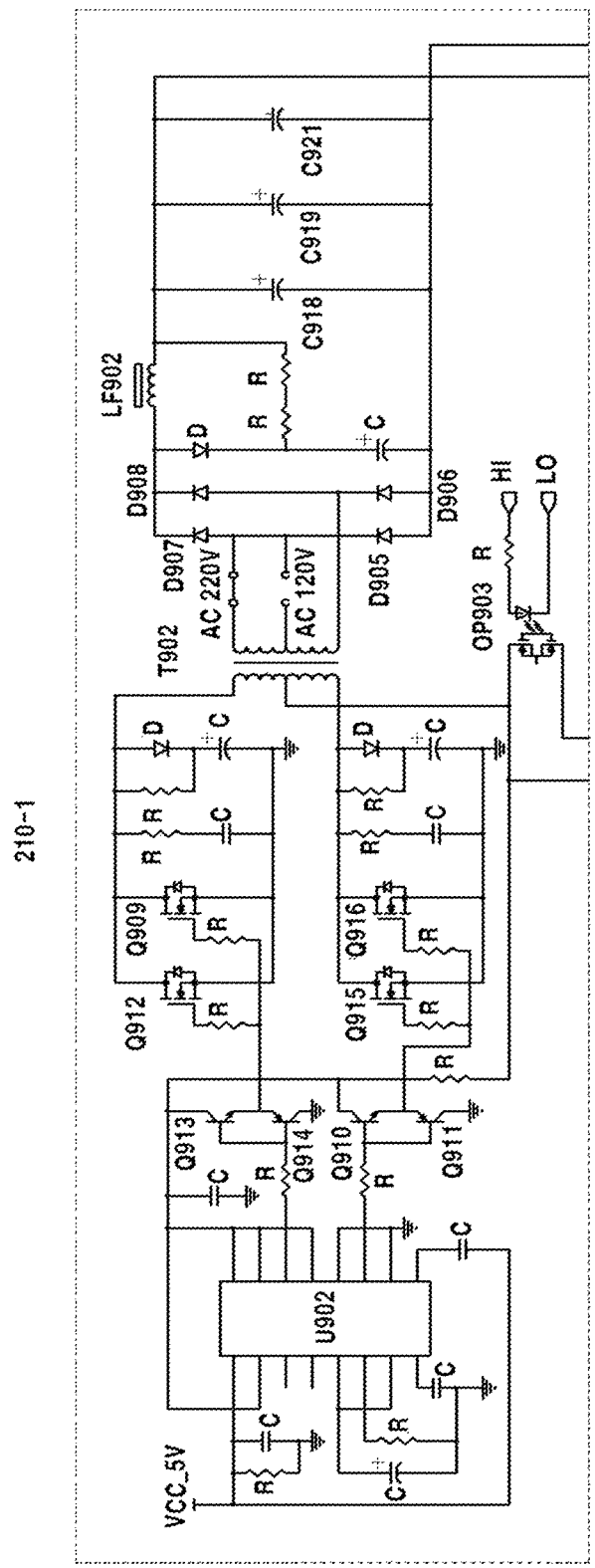
FIGS. 7A through 7C are detailed circuit diagrams of the AC-DC SMPS device according to the present invention.
Figure 7B:
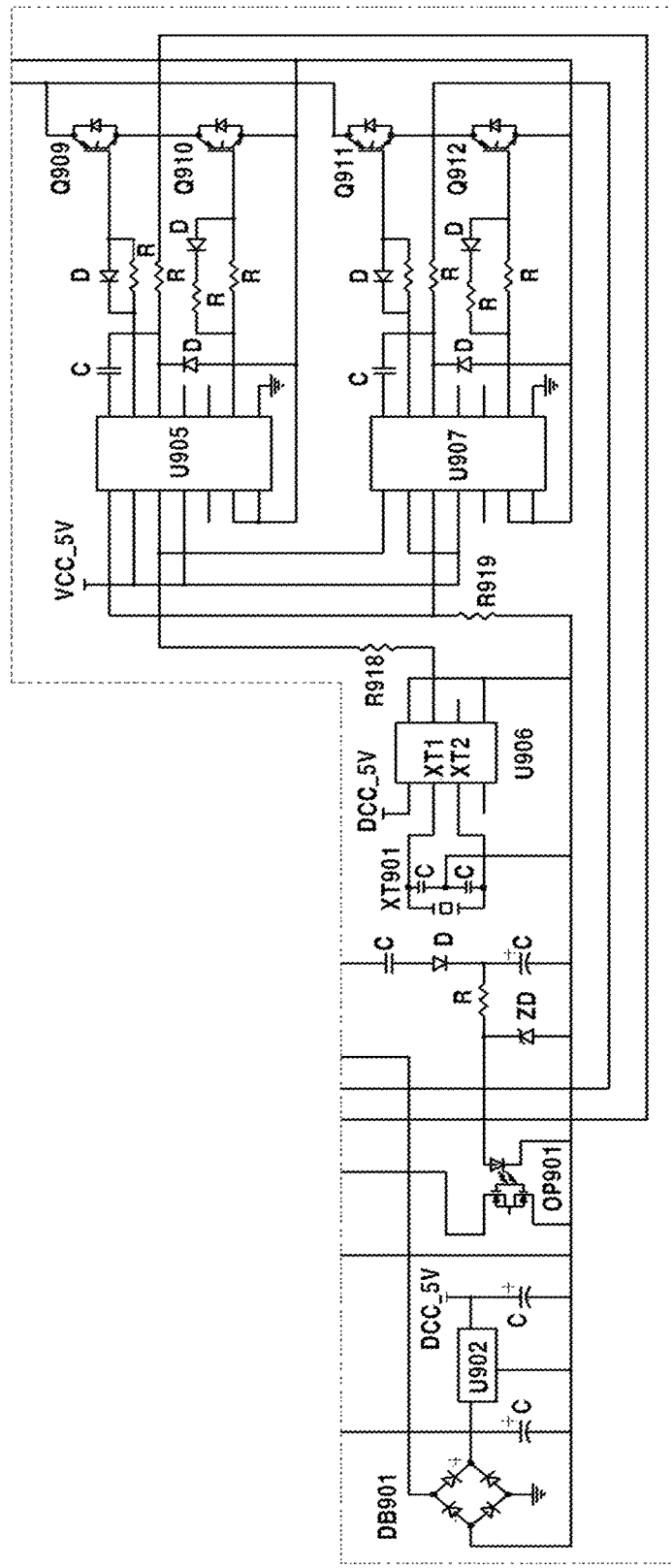
Figure 7C:
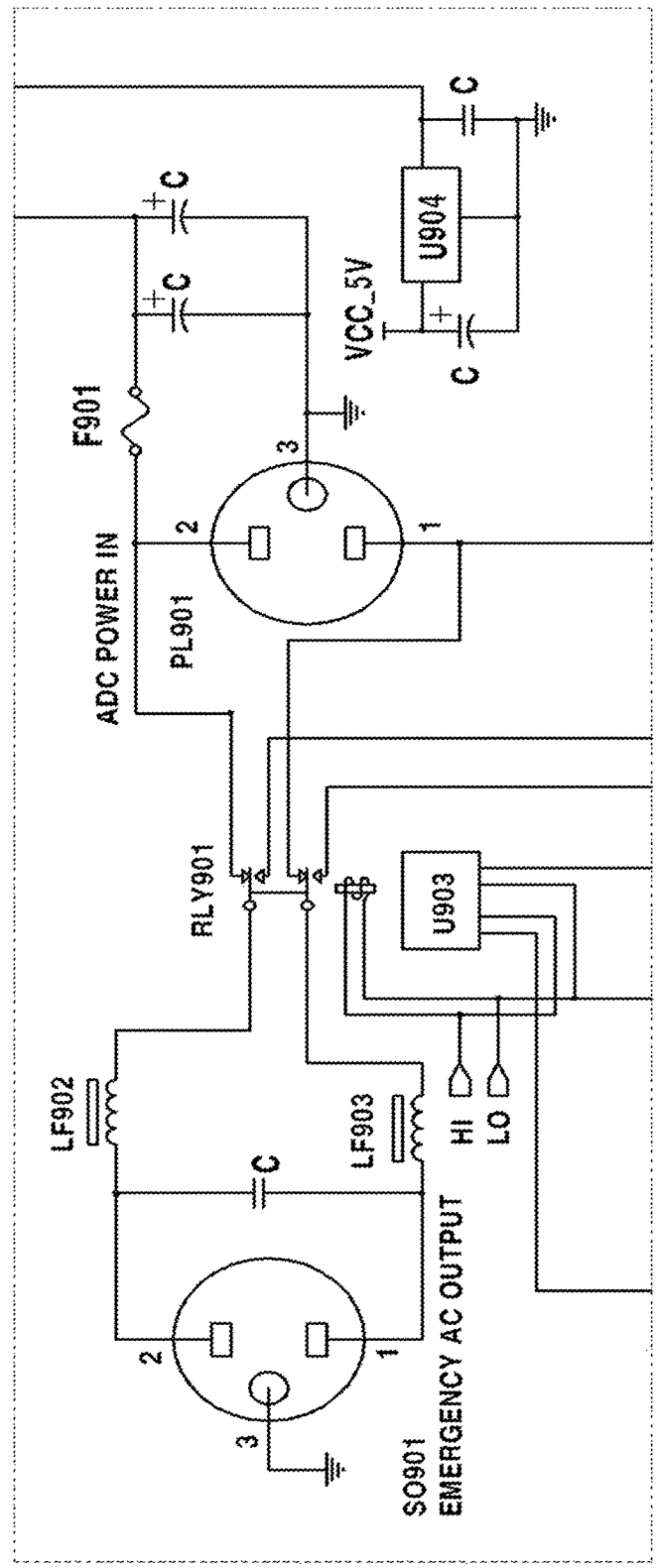

FIGS. 7A through 7C are detailed circuit diagrams of the AC-DC SMPS device according to the present invention.

Referring to a detailed view of a refrigerator module PFC circuit 210-1 of FIG. 7A, DC power is supplied through an AC-DC power line, and an IC U902 oscillates to trigger gates of switching devices Q912, Q909, Q915, and Q916 via switching devices Q913, Q914, Q910, and Q911, and DC power supplied to drains of the switching devices Q912, Q909, Q915, and Q916 flows to sources of the switching devices Q912, Q909, Q915, and Q916 via a transformer T902.

Also, AC power that is diverged to a secondary side of the transformer T902 is rectified by using diodes D907, D908, D905, and D906 to be converted to DC, and is smoothed using capacitors C918, C919, and C921 and output to a stage circuit 210-2.

Referring to FIG. 7B, in the stage circuit 210-2, an IC U905 oscillates an AC frequency with a crystal oscillator XT901, and outputs the same to ICs U906 and U907 through resistors R918 and R919.

The ICs U906 and U907 oscillate according to different phases to sequentially trigger gates of switching devices Q909, Q910, Q911, and Q912 to thereby convert DC power supplied to the drains of the switching devices Q909, Q910, Q911, and Q912 to AC power and output the same.

An adjustment circuit OP903 of FIG. 7A does not supply power for a circuit when normal AC power is normally supplied but supplies power only in the event of a power failure to operate the circuit.

Referring to FIG. 7C, a refrigerator module relay switch RLY901 denotes a relay switch for power conversion, an IC U903 denotes a driving IC, OP901 in FIG. 7B denotes a sensor switch, and DB901 and U902 denote circuits for supplying power to the IC U905.

A refrigerator module AC-DC power input unit 210-3 as illustrated in FIG. 7C outputs normal AC power between terminals #1 and #2 of a power plug PL901 when power is supplied normally, to a socket SO901 so as to operate a refrigerator, and in the event of a power failure, the refrigerator module relay switch RLY901 is automatically converted to convert DC power input between terminals #2 and #3 of the power plug PL901 to AC power so as to output the same to the socket SO901, thereby preventing food from rotting in the refrigerator, which may occur in the event of a power failure.

According to the AC-DC power supply device of the present invention, conventional electrical wiring may be used, and AC and DC power may be stably supplied at the same time. Moreover, not only illumination but Internet connection and use of computers are still possible even if a power failure occurs.

Also, according to the AC-DC SMPS device, while supplying AC power and DC power by using a normal power supply, DC power of solar cells which is an alternative energy source is charged in a battery so that the DC power charged in the battery may be used or the DC power may be converted to AC power so as to enable transmission of electricity to an electric power company by grid line connection.

In particular, AC power and DC power may be supplied at the same time, and loss due to conversion of electricity between AC and DC may be minimized, and use of environment-friendly alternative energy may be facilitated. Furthermore, power may be charged in a battery for use or residual power may be transmitted to an electric power company to thereby efficiently use the power, and power may be supplied even in an emergency.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An alternating-current (AC)-direct current (DC) power supply device for converting normal power input through a hot wire, a neutral wire, and a ground wire to supply AC power between the hot wire and the neutral wire and between the hot wire and the ground wire and to supply DC power between a conversion neutral wire and the ground wire, the device comprising:
   a capacitor including a first terminal that is connected to the neutral wire and a second terminal that is connected to the conversion neutral wire;
   a second switch including a first terminal connected to the conversion neutral wire;
   a rechargeable battery including a positive terminal connected to a second terminal of the second switch and a negative terminal connected to the ground wire; and
   a switching mode power supply (SMPS) device converting power applied to the hot wire to a DC voltage having a predetermined voltage level, and supplying the DC voltage to a common terminal of the second switch and the rechargeable battery, a battery negative terminal of DC power applied to the conversion neutral wire, and the ground wire.

2. The AC-DC power supply device of claim 1, wherein the rechargeable battery comprises at least two rechargeable batteries that are connected serially or parallel.

3. The AC-DC power supply device of claim 1, further comprising a first switch that is connected to the capacitor in parallel.

* * * * *